United States Patent

[11] 3,561,311

| | | |
|---|---|---|
| [72] | Inventors | Dieter Nowak<br>Duisburg;<br>Gerhard Steck, Rheinhausen, Germany |
| [21] | Appl. No. | 823,371 |
| [22] | Filed | May 9, 1969 |
| [45] | Patented | Feb. 9, 1971 |
| [73] | Assignee | Demag Aktiengesellschaft<br>Duisburg, Germany |
| [32] | Priority | June 29, 1968 |
| [33] | | Germany |
| [31] | | 1,752,661 |

[54] ROTARY SHEARING DEVICE
10 Claims, 3 Drawing Figs.

[52] U.S. Cl. ................................................. 83/338,
83/304, 83/563
[51] Int. Cl. ......................................................... B23d 25/12,
B26d 1/56, B26d 5/08
[50] Field of Search........................................... 83/304,
305, 337, 338, 556, 557, 563

[56] References Cited
UNITED STATES PATENTS

| 2,401,639 | /1946 | Hawthorne.................. | 83/338 |
| 3,391,592 | /1968 | Tselikov et al................ | 83/305 |

*Primary Examiner*—Andrew R. Juhasz
*Assistant Examiner*—James F. Coan
*Attorney*—McGlew and Toren ABSTRACT: A rotary shearing device is formed by a pair of hollow shafts each containing an axially displaceable rod having a blade secured to it which is positioned within a blade drum rotatable with the hollow shaft. Normally, the blades are maintained in a rest position, however, by selectively displacing the rods the blades are moved toward each other affording a shearing action for rolled material passing between the blade drums. After each shearing operation the blades are retained in a rest position by brake means to prevent continued movement of the cutting blades.

PATENTED FEB 9 1971

INVENTORS
Dieter NOWAK
Gerhard STECK
BY

McGlew and Toren
their ATTORNEYS

ROTARY SHEARING DEVICE

SUMMARY OF THE INVENTION

The present invention is directed to a rotary shearing device for cutting rolled material of any desired cross section and, more particularly, it is directed to a arrangement for activating the blades which are coupled together for effecting the shearing action. The rolled material travels at a high rate of speed through the shearing device and the blades are held in a rest position until activated, at which time they perform the shearing action and then are held in the rest position until the next cutting operation is required. The displacement movement of the blades is effected by mechanical elements which can be controlled electromagnetically or by other means.

Rotating shears for cutting moving rolled material of any desired cross section is known in which laterally displaceable blades are arranged in revolving blade holders. The lateral displaceability of the blades in such equipment is produced by lever rods, racks and the like, which are connected to the blade and are controlled electromagnetically or are operated by mechanical driving means.

In this known arrangement, each of the blades is connected through a separate lever system with a different electromagnet and this construction results in considerable expense for both the mechanical and electrical elements. However, in addition, the rod joints and the electromagnets required in this arrangement are subject to considerable wear, particularly, where the velocity of the rolled material and the cutting velocity are high, that is, 50 meters per second or more. Because of the wear involved, constant attention and care must be given to the device, and, periodically, wornout parts must be replaced by new ones. The replacement of parts results in certain unavoidable work stoppages, and where unforeseen failures occur, such as the breakage in a joint or the failure of one of the magnets, extended downtime results since the entire axis of rolls within which the shear is located must be stopped. Such equipment downtime results in product waste which tends to increase the cost of the rolled stock, particularly if the failures in the device occur frequently.

A device has been suggested for employing a common drive motor for the shearing blades. In such an arrangement the blades are moved from a rest position to cut the passing rolled stock and after the completion of the cutting operation the blades are returned to the rest position.

In the device just described, two brake band couplings are connected to each other by a lever system with one acting as a gear coupling while the other acts as a gear brake. The element of the lever system connecting the spring band couplings which act on the free end of one coupling, for example, a disc with a relative large diameter, is under the action of additional elastic parts which have the tendency to release the end of the spring band of the coupling. This arrangement is quite costly and, in addition, the lever rods effecting the engagement and disengagement of the clutch and brake with their various bearings and joints are exposed to considerable wear. Moreover, the servomotor, which is constantly being activated for a small period only, is exposed to extreme stresses. Such stress is particularly disadvantageous in a shearing device where it is necessary that it be operated at high cutting speeds. Naturally, in such an arrangement the brake band couplings are also subject to considerable wear. It is understandable that these shearing devices cannot withstand the rugged rolling mill operation for long periods of time, and, as a result, downtime for overhauling the cutting device and replacing the shearing elements is unavoidable and also adds to the cost of the rolled product.

Accordingly, to avoid the considerable downtime involved in the known shearing devices, it is the primary object of the present invention to provide a rotating drum shear which is simple in design, involves fewer parts which reduces the problem involved with replacement of parts due to wear, and in which the hot rolled material traveling at a velocity of between 50 to 60 meters per second, can be cut and divided into uniform lengths.

In accordance with the present invention, blade drums containing the shearing blades are rotated at a speed corresponding to the velocity of travel of the rolled product by means of a drive motor through the medium of a gear transmission system. The blade drums are positioned on hollow shafts and rods extend through the hollow shafts and mount the blades within the drums with the rods interconnected to a single crankshaft for selectively effecting the shearing operation by means of a clutch device. The clutch device includes gear transmission means for driving the eccentric shaft from the drive motor for the blade drums. Further, after the shearing operation is completed, a brake engages the eccentric shaft, prevents the continued movement of the blades, and holds them in a rest position until the next cutting operation is required.

Another feature of the invention is the arrangement of the blade drums as hollow members in which the holders supporting the shearing blades are guided for axial movement toward one another during the cutting step.

Moreover, another feature of the invention is the provision of gear means mounted on the hollow shafts for affording the relative rotational operation of the blade drums.

Another characteristic of the invention is the connection of the drive motor to the shearing device by means of a known flexible coupling. Further, the gear transmission means for transferring the driving motion to the blade drums includes gear means mounted on the hollow shafts by known rigid couplings.

Still another feature of the invention is the arrangement of the shifting clutch to disengage the gear transmission to the crankshaft after the cutting operation has been completed and the blades have been rotated out of the cutting range.

Therefore, in accordance with the present invention, the shearing device is extremely simple in design, and is formed of a relatively small number of parts which are readily visible for inspection and easily accessible for maintenance and replacement. Since the rods for moving the blades into the shearing position are located within the hollow shafts which rotate the blade drums the device is relatively small and, as a result, occupies only a small space within the axis of the rolls. Another space-saving feature of the device is the placement of a portion of the gear transmission means on the hollow shafts for rotating the blade drums while another portion of the gear transmission means affords proper operation between the rods supporting the blades and the shifting clutch.

In producing the shearing action the blades are coupled to be displaced in opposite directions toward one another by means of the pull rods, both of which are connected to a single eccentric crankshaft extending transversely of the axes of the hollow shafts. By using a crankshaft, a number of transmission elements, such as lever rods and the like, are omitted, and, in addition, the wear normally experienced in such transmission arrangements is reduced by the present invention to an acceptable minimum. By employing split bearings for supporting the crankshaft, the shaft can be easily removed and replaced if it is necessary to do so. Due to the arrangement of the clutch device for operating the crankshaft, the shaft can be coupled and uncoupled in a very simple manner. The clutch can be operated by electromagnetic or electropneumatic means. Accordingly, the rolled material passing through the shearing device can be cut after a number of predetermined revolutions of the drum; that is, by employing the shearing device the rolled material can be cropped and cut into lengths corresponding to multiples of the blade drum circumference.

Another advantage of the present invention is the transmission ratio between the blade drums and the eccentric shaft, which is $i = 4:1$ where the rolled material has a velocity of about 60 meters per second. With such an arrangement a relatively small clutch can be employed, since it is not necessary that it be designed for the velocity of the rolled material of about 60 meters per second but only for a quarter of this value, that is, about 15 meters per second. This feature ensures a longer life for the clutch.

The various features of novelty which characterize the invention are pointed out with particularlity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
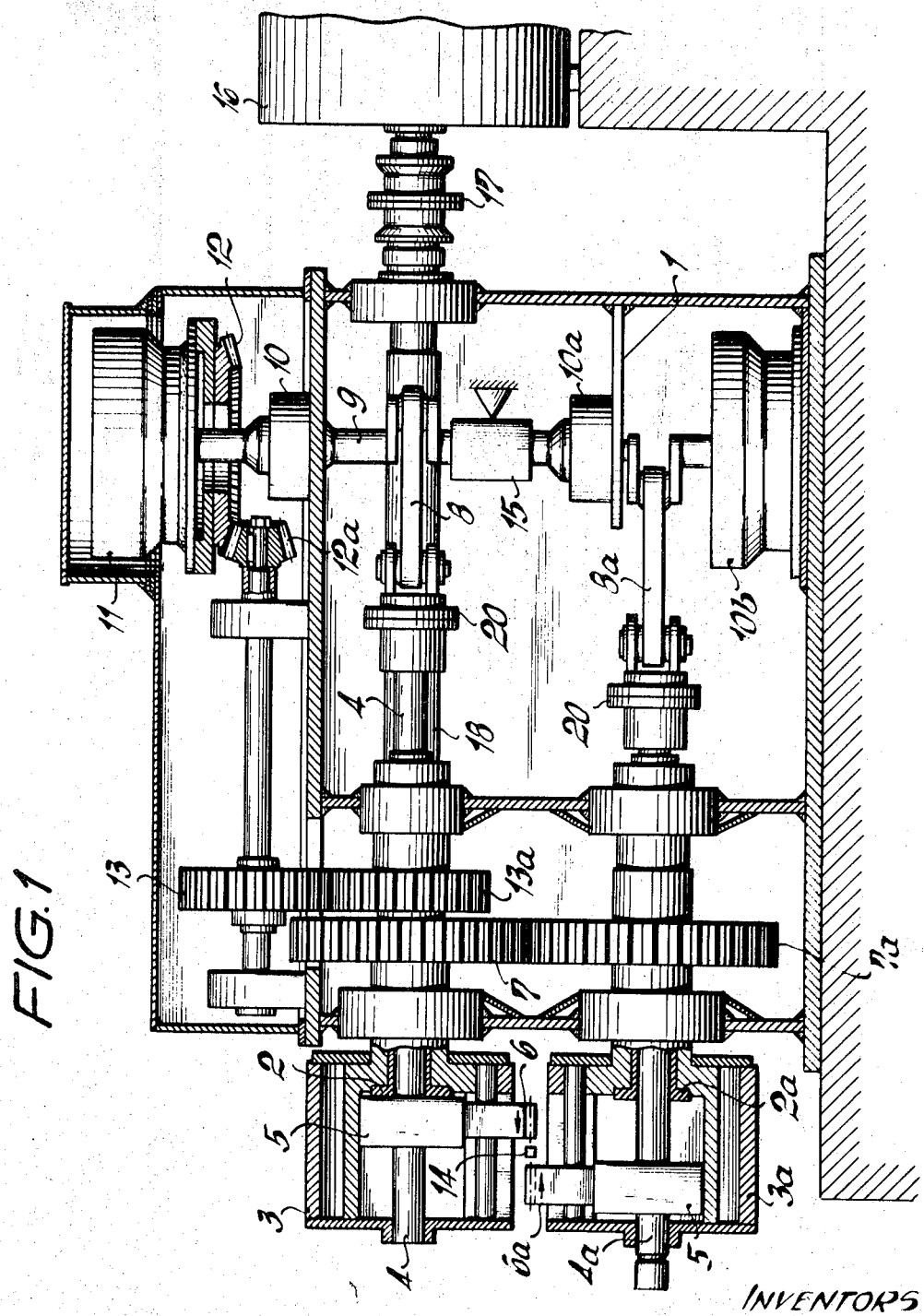
FIG. 1 is a view, partly in section, taken along line II–II of FIG. 2.
Figure 2:
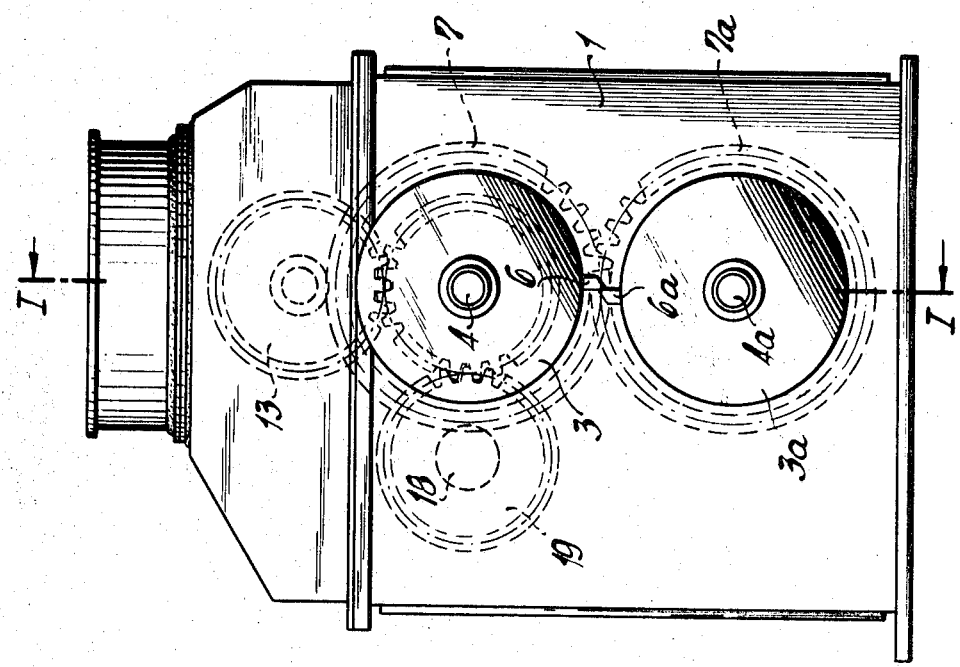
FIG. 2 is a front view of a device embodying the present invention.

As illustrated in FIGS. 1 and 2, the shearing device is comprised of a casing 1, preferably formed of welded construction, within which a pair of horizontally arranged vertically spaced hollow shafts 2, 2a are positioned in parallel relationship. On the exterior of the casing a pair of blade drums 3, 3a are secured to the hollow shafts 2, 2a respectively. Each of the hollow shafts contains a pull rod 4, 4a, which extends outwardly beyond the casing and extend through the blade drums 3, 3a. Within the blade drums, holders 5 are secured to the rods 4, 4a and mount cutting blades 6, 6a, respectively, so that they extend radially outwardly beyond the circumferential periphery of the drums. The rods 4, 4a are axially displaceable through the hollow shafts so that the blades on the opposed drums can be moved in opposite directions, toward one another, as indicated by the arrows in FIG. 1 for effecting the shearing operation on the rolled material 14 travelling between the drums. Within the casing a separate gearwheel 7, 7 a is affixed to each of the hollow shafts 2, 2a, respectively, for transmitting rotation between the two shafts.

In the casing 1, each of the rods 4, 4a is secured to a separate torque compensation element 20 and a connecting rod 8, 8a extends from each compensation element to an eccentric shaft 9 which is disposed perpendicularly to the axes of the hollow shafts. In the arrangement shown in the drawing, the hollow shafts extending horizontally and the crankshaft 9 extends vertically. Within the casing the crankshaft 9 is supported by bearings 10, 10a and 10b. These bearings can be of a split type for easy assembly and disassembly. Mounted on the upper end of the crankshaft 9 is a shifting clutch 11. A bevel gear 12 is formed on the lower face of the clutch 11 and is arranged to engage a corresponding bevel gear 12a mounted on a shaft which extends laterally and has a gearwheel 13 positioned at its opposite end. The gearwheel 13 is, in turn, in meshed engagement with a gearwheel 13a mounted on the hollow shaft 2. By placing the bevel gear 12 in engagement with the corresponding bevel gear 12a the crankshaft 9 can be driven from the gear transmission means mounted on the hollow shaft 2.

When the crankshaft is driven by the gears it rotates, and through the medium of the connecting rods 8, 8a and the torque transmission elements 20, the rods 4, 4a are axially displaced within the hollow shafts in opposite directions for effecting the shearing by means of with the blades 6, 6a fixed to the rods within the blade drums.

When the shearing operation has been completed the clutch disengages the crankshaft from the gear transmission means, however, there is still the tendency of the disengaged device to cause the blades to reciprocate relative to one another. To prevent this occurrence, a brake 15 is installed on the crankshaft 9 and at the same time that the clutch disengages the crankshaft from the gear transmission means the brake becomes operative and secures the blades 6, 6a in their rest positions.

Both the clutch 11 and the brake 15 can be of any known type, for example, of the electropneumatic type. The only requirement for the various types of operating devices is that they respond and become operative within a minimum period of time.

Positioned on the exterior of the casing 1 is a drive motor 16 which runs constantly and may be a DC motor. By means of a flexible coupling 17 the drive motor 16 is connected to the shaft 18. Mounted on the shaft 18 and spaced from the flexible coupling 17 is a gearwheel 19, see FIG. 2, which is in meshed engagement with the gearwheel 13a positioned on the hollow shaft 2. Therefore, with the drive force provided by the gear transmission means, the blade drums 3 are caused to rotate. The driving action is transmitted from the gearwheel 19 on the drive shaft 18 to the gearwheel 13a on the hollow shaft and then by the interengagement of the gearwheels 7, 7a on the hollow shafts 2, 2a, respectively both of the blade drums 3 and 3a are made to rotate at the same rate. Further, since the gearwheel 13 which forms a part of the gear transmission means to the eccentric shaft is connected to the gearwheel 13a, the crankshaft can be rotated by the drive motor 16.

Figure 3:
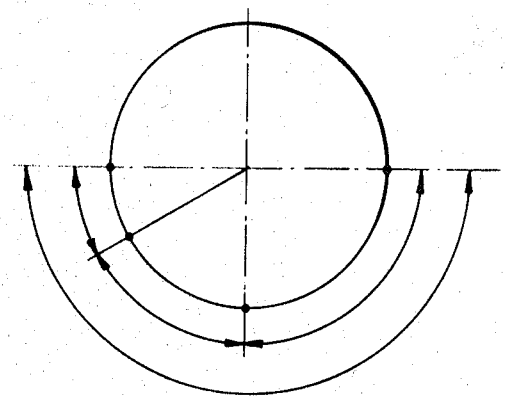
FIG. 3 is a diagram of the operation of the shearing blades.

In FIG. 3, a circle diagram represents schematically the operating cycle of the shearing blade. The engagement of the clutch 11 takes place in the range between 0° and 180° of the circle, while the stroke of the blades 6, 6a which effects the shearing of the rolled product 14 takes place in the range of 180° to 270°. Between 270° and 330° the rolled material passes through the blades. Effective at about 330°, the brake 15 mounted on the crankshaft 9 is made operative and with the disengagement of the gear transmission to the clutch the brake prevents the disengaged means from continuing to run. Accordingly, the working path of the blades for effecting the shearing operation is in the range of 180° to 360°.

By virtue of the rotary movement of the crankshaft 9, the blades 6, 6a are moved within two revolutions of the blade drums 3, 3a out of the rest or free position through the cutting position after one revolution and then into the opposite rest position.

By means of the shearing device, in accordance with the present invention, it is possible to cut rolled material which is travelling at the rate of 50 to 60 meters per second or greater. The obtainable cutting power depends substantially on the design of the shearing device and its maximum is about 15 tons.

We claim:

1. A shearing device for cutting rolled material comprising a pair of spaced hollow shafts disposed in parallel relationship, an axially displaceable rod positioned within each of said hollow shafts, a hollow blade drum secured to each of said hollow shafts and encircling an axially extending length of said rod, a shearing blade attached to each of said rods, said blades having a rest position and a cutting position within said blade drum, means secured to both of said rods for axially displacing said rods and moving said blades attached thereto in opposite directions toward one another from their rest positions into the cutting positions for effecting a shearing action, drive means for rotating said hollow shafts, means arranged both for selectively engaging said means for axially displacing said rods and for interconnecting said means for axially displacing said rod with said drive means, and means for retaining said blades in the rest position after the completion of the shearing action.

2. A shearing device, as set forth in claim 1, wherein said blade drum is mounted on one end of said hollow shaft, said rod being supported by and axially displaceable within said blade drum, a holder member secured to said rod and said shearing blade affixed to said holder member whereby as said blade drum rotates it affords a guiding action for said shearing blade being displaced axially through said blade drum.

3. A shearing device, as set forth in claim 1, wherein said means secured to both of said rods comprising a crankshaft extending transversely of said hollow shafts, and means interconnecting said crankshaft and said rods.

4. A shearing device, as set forth in claim 3, wherein said means interconnecting said crankshaft and said rods comprising a pair of connecting rods each attached at one end to said crankshaft, and a pair of torque compensation elements each connected to the opposite end of a different one of said connecting rods and to one of said rods within said hollow shaft.

5. A shearing device, as set forth in claim 1, wherein said drive means comprising a drive motor, a drive shaft, a flexible coupling interconnecting said drive motor and said drive shaft, a gear wheel affixed to said shaft at a spaced position from said flexible coupling, a second gearwheel affixed to said one of said hollow shafts and disposed in meshed engagement with said first gearwheel for driving said hollow shaft whereby said blade drum fitted on said hollow shaft can be driven at the same velocity as the rolling material fed past the blade drums.

6. A shearing device, as set forth in claim 5, wherein a third gearwheel affixed to said hollow shaft supporting said second gearwheel and a fourth gearwheel in meshed engagement with said third gearwheel and fixed to the other said hollow shaft whereby both of said hollow shafts are driven at the same velocity by said drive motor.

7. A shearing device, as set forth in claim 3, wherein said means for selectively engaging said crankshaft comprising a shift clutch arranged to be operatively connected to said crankshaft and a selectively engageable gear transmission means engaged with said second gearwheel and said clutch so that by engaging said clutch said crankshaft is driven through said gear transmission means by said drive motor.

8. A shearing device, as set forth in claim 7, wherein said gear transmission means comprising a first bevel gear connected to said clutch, a second bevel gear arranged to be selectively engaged with said first bevel gear, a shaft secured to said second bevel gear, a gearwheel fitted on said shaft supporting said second bevel gear and arranged to engage said second gearwheel for driving said crankshaft.

9. A shearing device, as set forth in claim 1, wherein said means for retaining said blades in the rest position comprising a brake device mounted on said crankshaft and arranged to operate to discontinue rotation of said crankshaft and displacement of said rods after the completion of a shearing operation.

10. A shearing device, as set forth in claim 3, wherein a casing enclosing said hollow shaft, crankshaft and drive shaft with said drive motor and said blade drums being disposed exteriorly of said casing, said hollow shafts being disposed horizontally and spaced vertically apart and said crankshaft being disposed vertically and intersecting the axes of said hollow shafts.